United States Patent [19]

Berdan

[11] 4,183,693
[45] Jan. 15, 1980

[54] CORNER PIECE FOR A DOUBLE GLAZED WINDOW CONSTRUCTION

[75] Inventor: Gunter H. Berdan, Toronto, Canada

[73] Assignee: Custom Rollforming Company Limited, Ontario, Canada

[21] Appl. No.: 893,404

[22] Filed: Apr. 4, 1978

[51] Int. Cl.² .............................................. E04C 2/38
[52] U.S. Cl. ..................................... 403/295; 52/656;
52/475; 52/788; 403/403
[58] Field of Search ................. 52/656, 790, 791, 788,
52/475, 476; 403/401, 402, 403, 295

[56] References Cited

U.S. PATENT DOCUMENTS

| | | | |
|---|---|---|---|
| 2,989,788 | 6/1961 | Kessler | 403/401 |
| 3,731,958 | 5/1973 | Offenbroich | 52/656 |
| 3,797,194 | 3/1974 | Ekstein | 52/656 |
| 4,080,482 | 3/1978 | Lacombe | 52/656 |

Primary Examiner—James L. Ridgill, Jr.

Attorney, Agent, or Firm—Stevens, Davis, Miller & Mosher

[57] ABSTRACT

A corner piece for connecting the ends of two adjacent spacers in a double glazed window unit, each spacer being formed from a metal strip bent into a hollow elongated form and having the edges forming an internal joint, the joint including one edge portion of the strip bent to form an outwardly facing groove and another edge portion of the strip bent to form an inwardly extending lip which is of lesser depth than the groove. The corner piece has two arms extending at 90° to each other, each arm having a base and two side flanges and being suitable for fitting in the end of an adjacent spacer. Said base of each arm has an inwardly angled extension having a recess at its outer end capable of receiving the edge portion of the strip which forms the groove to prevent spreading of the groove when the corner piece is inserted into a spacer.

18 Claims, 9 Drawing Figures

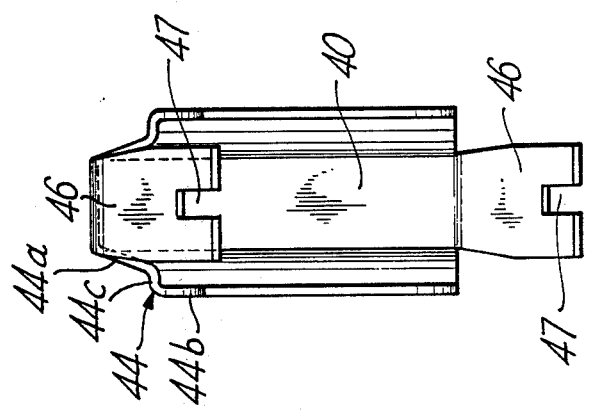
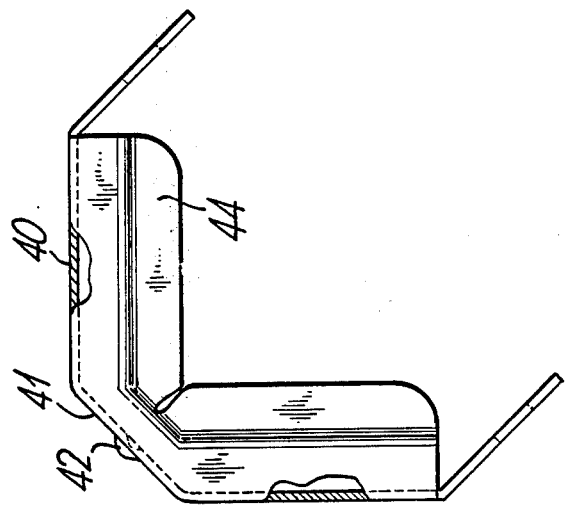

CORNER PIECE FOR A DOUBLE GLAZED WINDOW CONSTRUCTION

BACKGROUND OF THE INVENTION

The present invention relates to separator spacers for hermetically sealed double glazed window units, and particularly provides an improved corner piece for connecting the ends of adjacent spacers.

Spacers for separating the glass panels of a hermetically sealed doubled glazed unit are generally formed from a strip of metal which is roll formed into a tube. The tubular spacer extends around the glazing unit between the outer margins of the glass panels, sealant material being used between the glass and the sides of the spacer. In order to prevent any condensation of moisture between the glass panels which would interfere with visibility, the spacer tube contains a desiccant which absorbs any such moisture. In order for the desiccant to be effective, air passages must be provided between the inside of the spacer and the space between the glass panels, however any such air passages must be small enough to prevent the desiccant from falling from the inside of the spacer into the space between the glass panels.

In some previously known spacers, the edges of the strip of metal have been formed with inturned flanges merely butted together. With such constructions, however, the spacer tends to deform and spread at the junction between the flanges when the spacer is cut, leading to poor sealing between the glass panels and also opening up of the joint between the edges of the strip so that desiccant can fall from the spacer. In other known spacers, the edges of the strip have been locked together by means of a roll formed seal. Such seals, as now known, prevent distortion of the spacer when cut, but have two draw-backs, namely that it is necessary to form some kind of air passages between the inside and the outside of the spacer (requiring a separate operation), so that the desicant can be effective as described, and furthermore the joints as produced have been on the outside of the spacer and present a somewhat unattractive appearance since they are visible when looking through the glass panels of the unit.

My Canadian Pat. No. 1,008,307 issued Apr. 12, 1977 provides a method whereby a metal strip can be formed economically into a spacer for double glazed window units, the spacer being formed with a joint which prevents distortion during cutting, which does not detract from the appearance of the spacer, and in which air passages are provided without any separate forming operations.

The aforesaid patent also describes a spacer for hermetically sealed double glazed window units formed from a metal strip and having a joint between the edges of the strip, in which the joint includes one edge portion of the strip bent to form an outwardly facing groove and another edge portion of the strip bent to form an inwardly extending lip, which lip is of lesser width than the depth of the groove.

BRIEF SUMMARY OF THE INVENTION

The present invention provides a special corner piece having two arms extending at 90° to each other, each arm having a base and two side flanges and being suitable for fitting into an end portion of one of the spacers. The bases form the outer surfaces of the corner piece and in accordace with one aspect of the invention each base has an inwardly angled extension which extends into the adjacent spacer and which has a recess to receive the inwardly projecting joint of the adjacent spacer end portion and which holds the joint against distortion caused by pushing the corner piece into the end of the spacer, the arms being an interference fit within the ends of the spacers. In accordance with another aspect of the invention, said bases have serrations formed thereon which grip the adjacent surfaces of a spacer end portion when the corner piece is inserted thereby to give extra holding power to the corner piece.

Further features of the invention are set forth in the appended claims.

BRIEF DESCRIPTION OF THE DRAWINGS

The invention will now be particularly described with reference to the accompanying drawings, in which:

FIG. 2 shows a side view of a corner piece,

FIG. 3 shows an end view of the same corner piece.

DESCRIPTION OF THE PREFERRED EMBODIMENTS

Figure 1A:
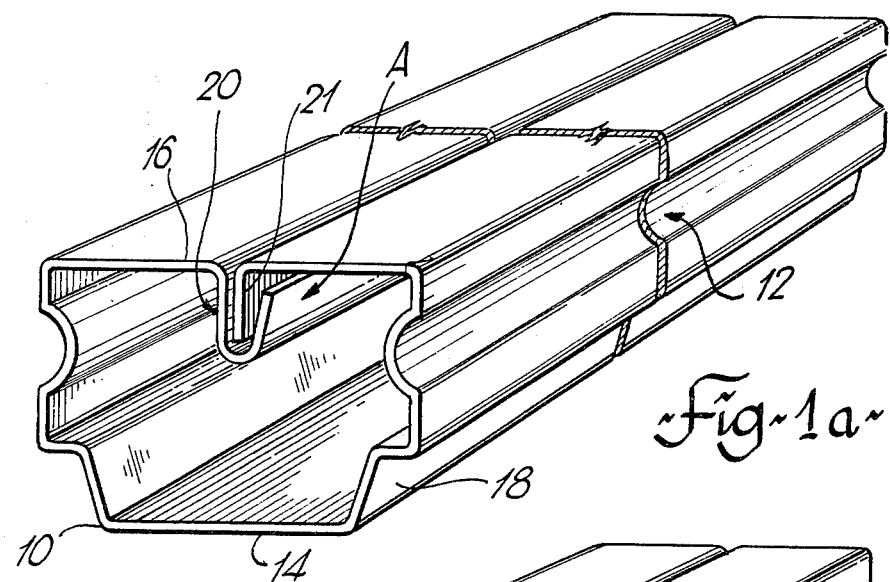
FIG. 1 shows three forms of spacer, in FIGS. 1a, 1b, and 1c respectively.
Figure 1B:
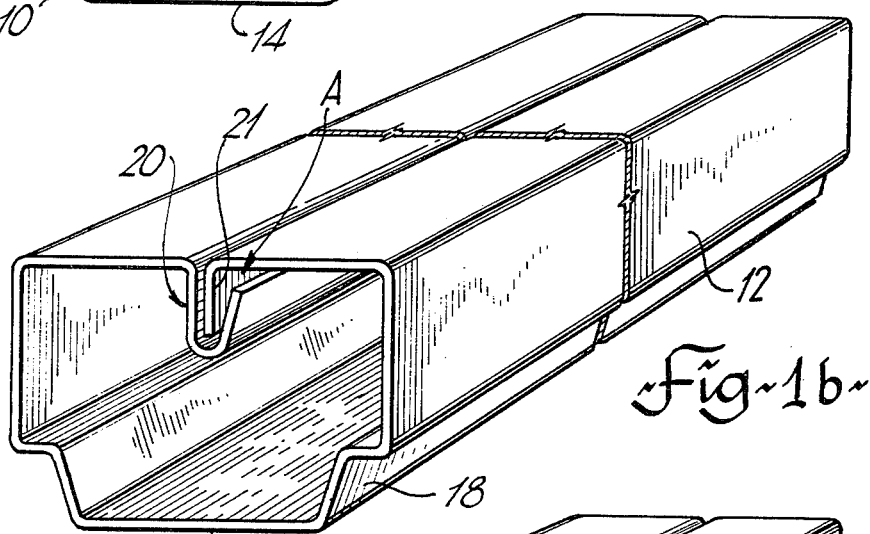
Figure 1C:
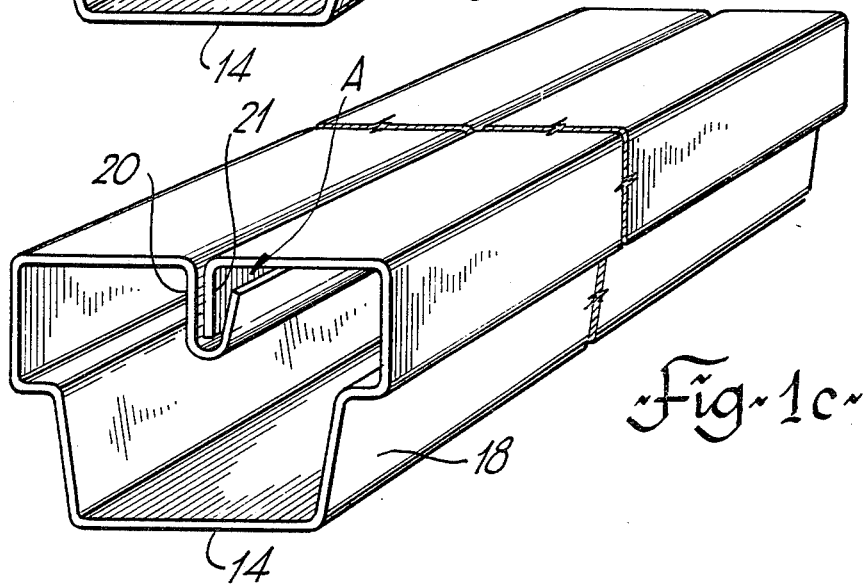

The spacers shown in FIG. 1 are all formed of a single strip of metal 10 bent into tubular form and having joint A formed in accordance with the invention. The general shape of the spacer, apart from joint A, is conventional, each spacer including sides 12 which in use abut the inside surfaces of two adjacent glazing panels, the spacer also having a flat outside surface 14 and an inside surface 16 which is generally flat apart from the slight groove apparent above the joint A. This inside surface 16, which is exposed to view in the final panel, is thus of a pleasing appearance, without any obvious joint or discontinuity. Each spacer has an outer recess 18 at each of its sides, for receiving sealant material, and the spacer shown in FIG. 1a also has a further recess 19 in each of its sides also for sealant material.

It may be seen that joint A includes one edge portion 20 of the strip forming the spacer which is bent to form an outwardly facing groove, and the opposite edge portion 21 of the strip is bent to form an inwardly extending lip which is of lesser width than the depth of the groove formed by portion 20. Also, the outer wall of the groove diverges outwardly from the bottom of the groove (at an angle of about 10°) so that the sides of the groove are clear of the adjacent sides of lip 21. With this arrangement, air flow is possible between both sides of lip 21 and the adjacent surfaces of the groove, and also around the bottom edge of lip 21. Also, it will be apparent that lip 21 can move laterally to a small extent within the groove thus allowing slight changes in the width of the spacer depending on the pressure applied by the panes of glass which it separates. Although the joint provides air flow so that desiccant within the spacer is effective, the joint is such as to prevent the desiccant from falling out of the spacer, even where the desiccant is a fine powder. The joint also holds the edges of the strip together when this is being cut and prevents distortion of the spacer.

The process whereby a flat metal strip is formed into the spacer shown in FIG. 1 is described in my Canadian Pat. No. 1,008,307 referred to above.

FIGS. 2 and 3 show views of the corner piece of this invention which is particularly adapted for use with the spacer as described and which includes means to prevent any spreading or distortion of the joint in the spacer when inserted into the spacer ends.

The corner piece is formed from a flat piece of metal, for example, aluminum, stamped into shape. The corner piece has two arms extending at 90° to each other, each arm including a flat base 40, the bases of the two arms being joined by a connecting base portion 41 having a central dimple 42, and extending at an angle of 45° to the two bases 40 so that the bases form the outer surfaces of the corner piece. Each of the arms is provided with two side flanges 44, turned inwardly from the bases 40, each side flange including two approximately parallel portions 44a and 44b joined by a shoulder 44c. The cross-sectional shape of the arm so produced suits it for being inserted into the end of the spacer with the outer edges of flanges 44 against the inner surfaces of the walls 16 of the spacer, and with the base 40 of each arm against the inside of the wall 14 of the spacer.

Each corner piece is also provided with an extension 46 of each of the bases 40, this extension being angled inwardly at an angle of 45° to the adjacent base and extending beyond the ends of flanges 44. As particularly shown in FIG. 2, the outer end of each of the extensions 46 is provided with a recess 47, which is dimensioned and positioned so that its sides locate against the sides of the side edge portion 20 of the spacer which forms the groove of the joint. Thus, the extension 46 with recess 47 provides means for preventing any spreading of the joints when the corner piece is inserted into the end of a spacer, notwithstanding that the flanges 44 are an interference fit against the insides of the spacer and thus would otherwise tend to spread the joints.

The corner piece shown in FIGS. 4 to 7 has the same characterizing features as the corner piece previously described, and is used in generally the same manner. However, this corner piece has certain modifications as follows:

(1) The angled extensions 146 of the bases 140 of the corner piece are wider than with the first embodiment and are shaped to completely or almost completely conform with the internal shape of the spacer ends so as to prevent substantial leakage of desiccant from inside the spacers. In the first embodiment of corner piece, it was necessary to use a cotton plug, held in place by the corner piece, to retain the desiccant, but with the new corner piece the cotton plug is not required.

(2) The extensions 146 of the bases are curved, so as to be outwardly concave, and the rounded edges facilitate insertion into the spacers. Also, the side edges of the extensions are integrally connected to the side flanges 144 of the corner piece, this feature further insuring that there is no leakage of desiccant material between the side flanges and the base extensions, and also stiffening the base extensions.

Figure 4:
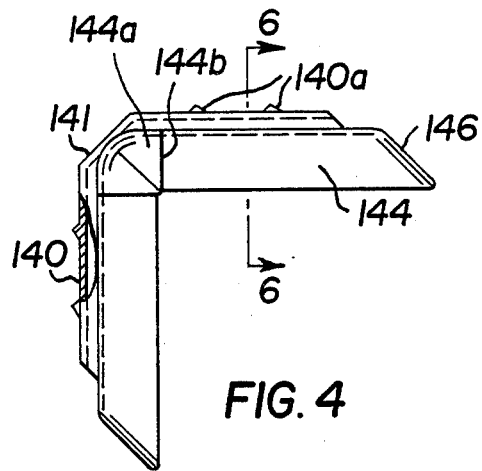
FIG. 4 shows a side elevation of a modified corner piece.

(3) The side flanges 144 on each side of the corner piece have adjacent outwardly displaced portions 144a, i.e. the portions are upwardly raised when the corner piece is viewed from the side as in FIG. 4. These raised portions each provide an abutment 144b which is perpendicular to the arm and which locates against the end of a spacer when the corner piece is inserted into the end portion thereof, so as to form a stop which positively locates the corner piece.

(4) On each base 40 there are formed two outwardly projecting serrations 140a which are in the form of small louvers cut from the bases and angled towards the corner of the corner piece, so as to have a sharp edge which grips the adjacent surface of a spacer end portion when the corner piece is inserted. These serrations prevent the corner piece from sliding out of the spacer when a large frame is assembled, which occasionally happens when the corner piece of the first embodiment is used with a large frame. These serrations thus give extra locking security.

(5) The two bases 140 of the corner piece are connected by a sloping intermediate portion 141 which is angled at about 45° to the bases, and this portion, instead of having an outwardly projecting dimple as in the first embodiment, has an inwardly projecting rib 142 which extends between the adjacent ends of the two bases. This gives added strength to the corner.

Figure 5:
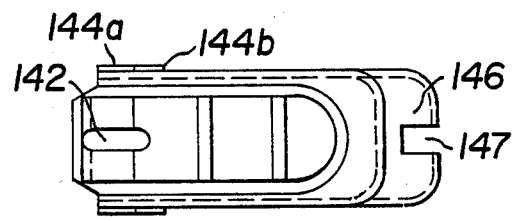
FIG. 5 shows an end view of the same corner piece.
Figure 6:
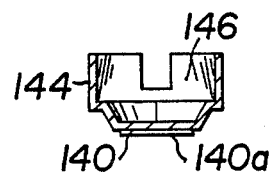
FIG. 6 shows a cross-sectional view on lines 6—6 of FIG. 4.
Figure 7:
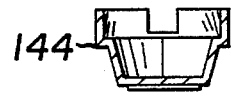
FIG. 7 shows a similar cross-sectional view of a variation of the modified corner piece.

FIG. 6 shows the cross-section of the corner piece as shown in FIGS. 4 and 5, and FIG. 7 shows a slightly modified corner piece having a higher profile on the side flanges.

I claim:

1. In a corner piece for connecting the ends of two adjacent spacers in a hermetically sealed double glazed window, each said spacer being formed of a metal strip bent into a hollow elongated form with adjacent edges of the strip forming a joint which projects into the hollow interior of the spacer, the joint including one edge portion of the strip bent to form an outwardly facing groove and another edge portion of the strip bent to form an inwardly extending lip which lip fits into said outwardly facing groove, said corner piece having two arms extending at 90° to each other, each arm being suitable for fitting into an adjacent end portion of one of said spacers and each arm having a base and two side flanges such that the bases form the outside of the corner piece, the improvement wherein each of said bases has a respective inwardly angled extension, each extension being formed integrally with its associated base and having an outer edge portion extending transversely relative to its associated arm, each extension having a narrow slot-like recess formed in its outer edge portion, said recess of each extension being suitable for receiving and embracing the sides of said one edge portion of the spacer strip which forms the groove so that the sides of said recess prevent spreading of the spacer joint when an arm of the corner piece is inserted into the end portion of a spacer.

2. In a corner construction for a hermetically sealed double glazed window, consisting of a corner piece and two spacers each formed from a metal strip bent into a hollow elongated form and having a joint connecting the edges of the strip and projecting into the hollow interior of the spacer, the joint including one edge portion of the strip bent to form a groove facing outwardly from the interior of the spacer and another edge portion of the strip bent to form a lip extending into the interior of the spacer, said spacers extending perpendicularly to each other with adjacent ends of said spacers joined by the corner piece, said corner piece having two arms each of which is an interference fit into a respective spacer end portion and each comprising a base and two side flanges such that the bases form the outside surfaces of the corner piece, the improvement wherein said arms further each include a respective extension of its associated base angled inwardly therefrom, each extension being formed integrally with its associated base and having an outer edge portion extending transversely relative to its associated arm, and each extension having a narrow recess formed in its outer edge portion, said recess on each arm extension receiving the sides of said one edge portion of each spacer which forms the groove, the sides of said recess engaging and embracing said one edge portion to prevent spreading of the joint when the arm of the corner piece is inserted into the adjacent end portion of the respective spacer.

3. The improved corner construction according to claim 2, wherein said inwardly angled extensions of the corner piece are shaped to conform with the internal shape of the spacer ends and so as to prevent substantial leakage of desiccant material from inside the spacers past the sides of said extensions.

4. The improved corner construction according to claim 2, wherein the side edges of said corner piece extensions are integrally connected to the adjacent side flanges of the respective arms.

5. The improved corner construction according to claim 2, wherein said side flanges on each side of the corner piece have adjacent outwardly displaced portions arranged to locate against the ends of said spacers when the arms are inserted into the end portions thereof.

6. The improved corner construction according to claim 2, wherein said bases of the corner piece are formed with outwardly projecting serrations suitable for engaging with the interior of the spacer end portions to inhibit removal of the arms from the spacers.

7. The improved corner construction according to claim 2, wherein the two bases of the corner piece are connected by an intermediate portion of metal sloping between two said bases, said intermediate portion having an inwardly projecting rib extending between adjacent ends of said bases.

8. In a corner piece for connecting the ends of two adjacent spacers of a hermetically sealed double glazed window, each said spacer being formed of a metal strip bent into a hollow elongated form with adjacent edges of the strip forming a joint which projects into the hollow interior of the spacer, said corner piece having two arms extending at 90° to each other, each arm being suitable for fitting in an adjacent end portion of one said spacers, and each arm having a base and two side flanges with said bases forming the outside surface of the corner piece, the improvement wherein each of said bases is provided with a respective inwardly angled extension, each extension being formed integrally with its associated base and having an outer edge portion extending transversely relative to its associated arm, each extension having a narrow recess formed in its outer edge portion, the recess in each extension being suitable for receiving therein the inwardly projecting joint of the adjacent spacer end portion so that the sides of said recess embrace and thus prevent spreading of said joint when an arm of the corner piece is inserted into the end portion of the spacer.

9. The improved corner piece according to claim 8, wherein said inwardly angled extensions are shaped to conform with the internal shape of the spacer ends and so as to prevent substantial leakage of desiccant material from inside the spacers past the sides of said extensions.

10. The improved corner piece according to claim 8 or claim 9, wherein side edges of said extensions are integrally connected to the adjacent side flanges of the respective arms.

11. The improved corner piece according to claim 8 or claim 1, wherein said side flanges on each side of the corner piece have adjacent outwardly displaced portions arranged to locate against the ends of said spacers when the arms are inserted into the end portions thereof.

12. The improved corner piece according to claim 8 or claim 1, wherein said bases are formed with outwardly projecting serrations suitable for engaging with the interior of the spacer end portions to inhibit removal of the arms from the spacers.

13. The improved corner piece according to claim 8 or claim 1, wherein the two said bases are connected by an intermediate portion of metal sloping between two said bases, said intermediate portion having an inwardly projecting rib extending between adjacent ends of said bases.

14. In a corner piece for connecting the ends of two adjacent spacers of a hermetically sealed double glazed window, each said spacer being formed of a metal strip bent into a hollow elongated form with adjacent edges of the strip forming a joint which projects into the hollow interior of the spacer, said corner piece having two free-ended arms extending at 90° to each other, each arm being suitable for fitting in an adjacent end portion of one said spacers, and each arm having a base and two side flanges with said bases forming the outside surface of the corner piece, the improvement wherein said bases are each formed with outwardly projecting rigid serrations each being angled away from the free end of the associated arm so that it is capable of gripping the interior surface of the spacer end portion to inhibit removal of the arm from the spacer.

15. The improved corner piece according to claim 14, wherein said inwardly angled extensions are shaped to conform with the internal shape of the spacer ends and so as to prevent substantial leakage of desiccant material from inside the spacers past the sides of said extensions.

16. The improved corner piece according to claim 15 wherein side edges of said extensions are integrally connected to the adjacent side flanges of the respective arms.

17. The improved corner piece according to claim 16 wherein said side flanges on each side of the corner piece have adjacent outwardly displaced portions arranged to locate against the ends of said spacers when the arms are inserted into the end portions thereof.

18. The improved corner piece according to claim 17 wherein the two said bases are connected by an intermediate portion of metal sloping between two said bases, said intermediate portion having an inwardly projecting rib extending between adjacent ends of said bases.

* * * * *